United States Patent Office 3,642,709
Patented Feb. 15, 1972

3,642,709
AZOXY CONTAINING POLYAMIDE POLYMERS
Franco Agolini, Wilmington, Del., assignor to E. I. du Pont de Nemours and Company, Wilmington, Del.
No Drawing. Filed May 31, 1968, Ser. No. 733,290
Int. Cl. C08g 20/20
U.S. Cl. 260—78 R
4 Claims

ABSTRACT OF THE DISCLOSURE

Polyamides derived from aromatic monomers containing azoxy groups, the polyamides having an inherent viscosity of at least 0.1, having good high temperature properties and which contract upon heating.

RELATED APPLICATIONS

United States applications for patent disclosing polymers which contract upon heating include Agolini, Ser. No. 666,966, filed Sept. 11, 1967, now abandoned and Agolini and Gay, Ser. No. 601,852, filed Dec. 15, 1966, now U.S. Pat. No. 3,455,879.

BACKGROUND OF THE INVENTION

This invention relates to new aromatic polyamides having a unique combination of properties. Significant art includes French Pat. 1,506,518, Rhone-Poulenc, which describes polyamide-acids and polyimides based on dianhydrides containing azoxy linkages, such as azoxybenzene-3,4,3',4'-tetracarboxylic dianhydride; French Pat. 1,506,519, Rhode-Poulene, which discloses a specific preparative method for polyimides, including azoxy-containing polyimides. Significant United States patents include Loncrini, No. 3,182,073, which discloses diamides terminated by two anhydride groups, prepared from trimellitic anhydride and a diamine which may contain an azoxy link; and Loncrini, No. 3,355,427, which is concerned with polyimides.

SUMMARY OF THE INVENTION

The present invention provides new and useful polyamides having a unique combination of properties, the polyamides having the structural formula

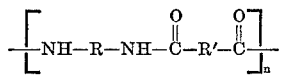

wherein R is an organic divalent radical containing at least 2 carbon atoms, the divalent radical being bonded to two nitrogen atoms and the nitrogen atoms being attached to different carbon atoms of the divalent radical; R' is an organic divalent radical containing at least two carbon atoms, the divalent radical being bonded to two carbonyl groups and the carbonyl groups being attached to different carbon atoms of that divalent radical; at least one of R and R' contains at least one azoxy group; and n is an integer sufficient to provide a polyamide polymer having an inherent viscosity of at least 0.1, preferably at least 0.3 to 3.0 or more, as measured at 30° C. on an 0.5% by weight solution in N,N-dimethylacetamide.

The polyamide polymers of the invention are useful as self-supporting films, fibers, filaments and the like. For example the polymers have good high temperature properties, and therefore are useful as high temperature fabric, electrical insulation, and so forth. In addition, these polyamides reversibly contract upon exposure to heat or light. As a result of this unusual thermotropic and photo- tropic response, the polymers possess muscle-like behavior and can be used in heat- and light-sensitive cut-off or signaling devices which operate in a fashion just opposite to devices which contain a sensitive element which expands on exposure to heat or light.

These unusual properties also permit the preparation of shaped polyamide articles having a zero coefficient of thermal expansion. By including the proper amounts of azoxy-containing and non-azoxy-containing reactants, the amounts for any given combination of specific monomers being easily determined empirically, it would be possible to prepare copolymeric polyamides having essentially zero coefficient of thermal expansion over substantial temperature ranges. The polyamides are colored, generally yellow-green, yellow, orange or red.

In the preferred polyamide polymers R and R' are each arylene; that is, each is a divalent aromatic radical containing at least one carbocyclic or heterocyclic ring, the ring characterized by benzenoic unsaturation, the two substituents being attached directly to separate carbon atoms in a ring of the radical. More specifically, R and R' are divalent organic radicals of the group

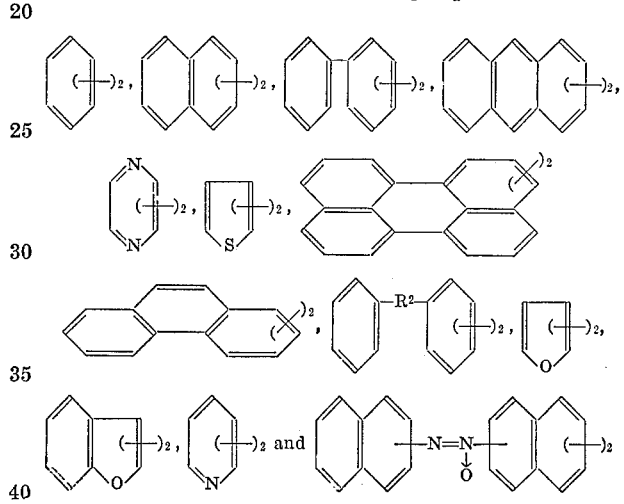

wherein $R^2$ is selected from the group consisting of an alkylene chain having 1–3 carbon atoms

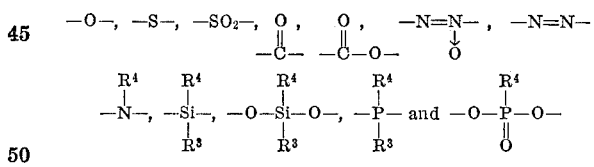

wherein $R^3$ and $R^4$ are alkyl or aryl, and substituted groups thereof; and wherein the valences can be attached to the same or different rings in the polycyclic aromatic systems.

The polymers of this invention are prepared by reacting one or more diacid chlorides or bromides with one or more diamines, the reaction preferably being in a solvent for at least one of the reactants, at or above room temperature. Typical solvents which are suitable include, N-N-dimethylacetamide, N,N-diethylacetamide, N,N-dimethylmethoxyacetamide, N-methylcaprolactam, N-methyl-2-pyrrolidone, tetramethylurea, N,N-dimethylpropionamide, and hexamethylphosphoramide. A description of the process and elaboration on the suitable solvents is found in Kowlek, Morgan and Sorenson, U.S. Pat. 3,063,-966, issued Nov. 13, 1962. The entire disclosure of that patent is incorporated herein by reference.

Typical azoxy-containing dicarboxylic acids that can be used in the reaction in the form of their diacid chlorides or diacid bromides include: azoxybenzene-3,3'-dicarboxylic acid, azoxybenzene-4,4'-dicarboxylic acid, azoxybenzene-3,4'-dicarboxylic acid, azoxybenzene-3',4-dicarboxylic acid, 2,2'-azoxynaphthalene-6,6'-dicarboxylic acid, and 1,1'-azoxynaphthalene-5,5'-dicarboxylic acid.

Typical azoxy-containing diamines include 4,4'-diaminoazoxybenzene, 3,3'-diaminoazoxybenzene, 3,4'-diaminoazoxybenzene, and 2,4'-diaminoazoxybenzene.

Illustrative of other diamines which can be used, but which do not contain an azoxy linkage are:

meta-phenylene-diamine;
para-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
3,3'-diaminodiphenyl sulfide;
4,4'-diaminodiphenyl ether;
2,6-diaminopyridine;
bis-(3-aminophenyl)diethyl silane;
N,N-bis-(4-aminophenyl) methylamine;
1,5-diaminonaphthalene;
3,3'-dimethyl-4,4'-diaminobiphenyl;
3,3'-dimethoxybenzidine;
2,4'-bis(beta-amino-t-butyl)toluene;
bis-(para-beta-amino-t-butyl-phenyl)ether;
para-bis-(2-methyl-4-aminopentyl)benzene;
para-bis(1,1-dimethyl-5-aminopentyl)benzene;
m-xylylenediamine;
p-xylylenediamine;
bis(para-aminocyclohexyl)methane;
hexamethylenediamine;
heptamethylenediamine;
octamethylenediamine;
nonamethylenediamine;
decamethylenediamine;
3-methylheptamethylenediamine;
4,4-dimethylheptamethylenediamine;
2,11-diaminododecane;
1,2-bis-(3-aminopropoxy)ethane;
2,2-dimethylpropylenediamine;
3-methoxyhexamethylenediamine;
2,5-dimethylhexamethylenediamine;
2,5-dimethylheptamethylenediamine;
5-methylnonamethylenediamine;
1,4-diaminocyclohexane;
1,12-diaminooctadecane;
2,5-diamino-1,3,4-oxadiazole;
$H_2N(CH_2)_3S—(CH_2)_3NH_2$;
$H_2N(CH_2)_3N(CH_3)(CH_2)_3NH_2$;
3,3'-dichlorobenzidine;
bis-(4-aminophenyl) ethyl phosphine oxide;
bis-(4-aminophenyl)phenyl phosphine oxide;
N,N-bis-(4-aminophenyl) aniline;
4,4'-diaminobenzophenone;
3,3'-diaminobenzophenone;
3,4'-diaminobenzophenone;
4-aminophenyl 3-aminobenzoate;
4,4'-diaminoazobenzene;
3,3'-diaminoazobenzene;

and mixtures thereof.

Illustrative non-azoxy-containing dicarboxylic acids suitable for use in the form of their diacid chlorides or diacid bromides for making the polyamides include:

isophthalic acid;
terephthalic acid;
biphenyl-3,3'-dicarboxylic acid;
biphenyl-4,4'-dicarboxylic acid;
bis(3-carboxyphenyl)methane;
bis(4-carboxyphenyl)methane;
1,1-bis(3-carboxyphenyl)ethane;
2,2-bis(4-carboxyphenyl)propane;
naphthalene-1,5-dicarboxylic acid;
naphthalene-2,6-dicarboxylic acid;
bis(3-carboxyphenyl)ether;
bis(4-carboxyphenyl)ether;
bis(3-carboxyphenyl)ether;
bis(3-carboxyphenyl)sulfide;
bis(4-carboxyphenyl)sulfone;
benzophenone-4,4'-dicarboxylic acid;
benzophenone-3,3'-dicarboxylic acid;
benzophenone-3,4'-dicarboxylic acid;
pyrazine-2,5-dicarboxylic acid;
thiophene-2,5-dicarboxylic acid;
perylene-3,9-dicarboxylic acid;
anthracene-2,6-dicarboxylic acid;
pyridine-2,4-dicarboxylic acid;
azobenzene-4,4'-dicarboxylic acid;
azobenzene-3,3'-dicarboxylic acid;

and mixtures thereof.

The degree of polymerization of the polyamide is subject to control. The use of equal molar amounts of the reactants provides polyamides of high molecular weight. Polyamide polymers of this discovery have a molecular weight such that the inherent viscosity of the polymer is at least 0.1, preferably in the range of 0.3 to 3.0, so that shaped structures can be formed. The inherent viscosity is measured at 30° C. at a concentration of 0.5% by weight of the polymer in a suitable solvent such as N,N-dimethylacetamide. To calculate inherent viscosity, the viscosity of the polymer solution is measured relative to that of the solvent alone.

Inherent viscosity $$= \frac{\text{Natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The invention will be described further in conjunction with the following example.

Example

To a solution of 1.24 g. (0.005 mole) of 4,4'-diaminodiphenyl sulfone in 30 ml. of anhydrous N,N-dimethylacetamide was added 1.61 g. (0.005 mole) of azoxybenzene-4,4'-dicarboxylic diacid chloride in portions over a period of fifteen minutes, and the mixture was stirred for an additional 45 minutes. The resulting colored viscous solution was centrifuged, and part of the clear supernatant polymer solution was cast into film on a glass plate with a 20-mil doctor knife. The cast iron film and plate were placed in an oven at 140° C. for fifteen minutes. The film was then stripped from the plate, secured to a frame, and drying was completed in an oven at 180° C. The fim was clear, tough and strong.

Another portion of the centrifuged polymer solution was poured into water in a high shear stirrer (blender). The precipitated polymer was washed twice with water, twice with methanol, and twice with acetone, then dried under vacuum at 80° C. The inherent viscosity of the polyamide was 1.19, measured on a 0.5% by wt. solution in N,N-dimethylacetamide at 30° C.

The film prepared above had a modulus of about 500,000 p.s.i. On exposure to an infrared lamp, it contracted; when the lamp was turned off, the sample returned (expanded) to its original dimensions.

A sample of the polymer was subjected at 50–52° C. to the action of sunlamps (intermittent exposure) in a rotating FS weatherometer. At the end of 1588 exposure hours, the sample still showed no change in color or infrared absorption spectrum.

While the invention has been described with certain detail, it should be apparent that changes can be made therein without departing from its scope.

What is claimed is:

1. A polyamide polymer consisting essentially of the repeating unit having the structural formula

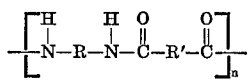

in which each of R and R' is a divalent organic radical selected from the group consisting of

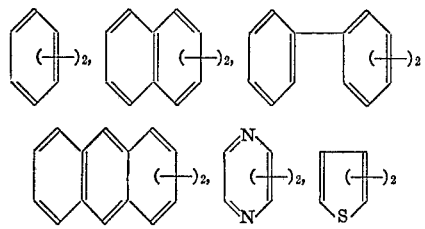

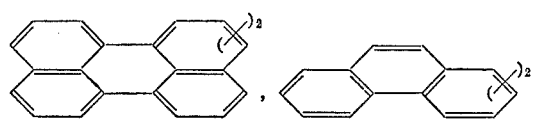

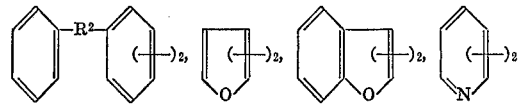

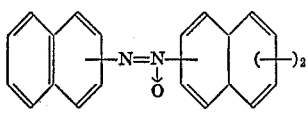

and

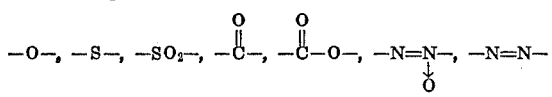

wherein R³ is selected from the group of an alkylene chain having 1-3 carbon atoms, $$-O-,\ -S-,\ -SO_2-,\ -\overset{O}{\underset{\|}{C}}-,\ -\overset{O}{\underset{\|}{C}}-O-,\ -N=\underset{\downarrow}{N}-,\ -N=N-$$
$$\phantom{-O-,\ -S-,\ -SO_2-,\ -\overset{O}{\underset{\|}{C}}-,\ -\overset{O}{\underset{\|}{C}}-O-,\ -N=}O$$

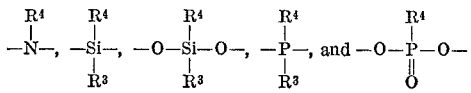

wherein R³ and R⁴ are alkyl or aryl, and substituted groups thereof; and wherein the valences can be attached to the same or different rings in the polycyclic aromatic systems; and n is an integer sufficient to provide a polymer having an inherent viscosity of at least 0.1 measured at 30° C. on a 0.5 percent by weight solution in N,N-dimethylacetamide, and at least one of said R and R' radicals contains one azoxy group.

2. The polymer of claim 1 in the form of a self-supporting film.

3. A polyamide polymer consisting essentially of the repeating unit having the structural formula

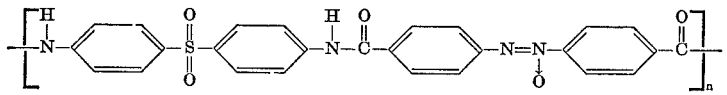

where n is an integer sufficient to provide an inherent viscosity of at least 0.1 measured at 30° C. on an 0.5 percent by weight solution in concentrated sulfuric acid.

4. The polymer of claim 3 in the form of a self-supporting film.

References Cited

UNITED STATES PATENTS 2,994,693   8/1961   Blake et al. _____ 260—78

OTHER REFERENCES

Dine-Hart et al.: Journal of Polymer Science, Part B, vol. 2, No. 4 (1964), pp. 369–373.

HAROLD D. ANDERSON, Primary Examiner

U.S. Cl. X.R.

117—161 P; 260—32.6 N, 47 CZ, 63 R, 65 R

PO-1050
(5/69)

UNITED STATES PATENT OFFICE
CERTIFICATE OF CORRECTION

Patent No. 3,642,709                    Dated February 15, 1972

Inventor(s)            Franco Agolini

It is certified that error appears in the above-identified patent and that said Letters Patent are hereby corrected as shown below:

Column 5, line 43, "$R^3$" should read --$R^2$--; and after "group" the word --consisting-- should be inserted.

Signed and sealed this 1st day of August 1972.

(SEAL)
Attest:

EDWARD M. FLETCHER, JR.            ROBERT GOTTSCHALK
Attesting Officer                  Commissioner of Patents